United States Patent [19]

Le Polozec et al.

[11] Patent Number: 4,972,434
[45] Date of Patent: Nov. 20, 1990

[54] RECEIVER FOR A SPACE DIVERSITY RADIO TRANSMISSION SYSTEM, THE RECEIVER INCLUDING A DIVERSITY COMBINER

[75] Inventors: Xavier Le Polozec; Dominique Pujol, both of Paris, France

[73] Assignee: Alcatel N.V., Amsterdam, Netherlands

[21] Appl. No.: 324,571

[22] Filed: Mar. 16, 1989

Related U.S. Application Data

[63] Continuation-in-part of Ser. No. 324,583, Mar. 16, 1989, abandoned.

[30] Foreign Application Priority Data

Mar. 18, 1988 [FR] France .............................. 88 03546

[51] Int. Cl.$^5$ .............................................. H03H 7/30
[52] U.S. Cl. ...................................... 375/14; 375/100; 455/139
[58] Field of Search ............... 375/100, 101; 455/137, 455/138, 139, 140, 141, 273, 276, 278

[56] References Cited

U.S. PATENT DOCUMENTS

| | | | |
|---|---|---|---|
| 4,079,318 | 3/1978 | Kinoshita | 455/276 |
| 4,146,840 | 3/1979 | McRae | 325/42 |
| 4,271,525 | 6/1981 | Watanabe | 375/100 |
| 4,281,411 | 7/1981 | Bonn | 375/17 |
| 4,326,294 | 4/1983 | Okamoto et al. | 455/139 |
| 4,593,413 | 4/1986 | Ozaki | 455/276 |

FOREIGN PATENT DOCUMENTS 0227015 7/1987 European Pat. Off.

OTHER PUBLICATIONS

"Auto-Adaptivite dans les Faisceaux Hertziens Numeriques", L'Onde Electrique, Mars 1986, vol. 66-N"2.

Primary Examiner—Benedict V. Safourek
Assistant Examiner—Tesfaldet Bocure
Attorney, Agent, or Firm—Christie, Parker & Hale

[57] ABSTRACT

A receiver for a space diversity radio transmission system, the receiver including a diversity combiner (CD) and a diversity control circuit (7) which is responsive, inter alia, to a distortion value (F). If the receiver includes a self-adaptive equalizer (6) in the transmission path of the composite output, the control circuit may calculate the distortion value from the coefficients (ai, bi) used to control the filter portion (EG) of the equalizer. If the combiner is also responsive to an insufficient power value (G), the distortion value may be added to the insufficient power value in order to obtain a single control magnitude (8) which is used for controlling the diversity combiner in a manner that avoids any abrupt transition between the low power mode and the low distortion mode.

20 Claims, 4 Drawing Sheets

RECEIVER FOR A SPACE DIVERSITY RADIO TRANSMISSION SYSTEM, THE RECEIVER INCLUDING A DIVERSITY COMBINER

CROSS REFERENCE TO RELATED APPLICATION

This application is a continuation-in-part of commonly assigned copending application Ser. No. 07/324,583 filed on even date herewith and now abandoned.

The present invention relates to receivers for radio transmission systems, and more particularly to receivers which make use of space diversity in order to limit the effects of distortion due to multiple path propagation.

BACKGROUND OF THE INVENTION

A receiver of this type is described in the article entitled "Auto-adaptivité dans les faisceaux hertziens numèeriques" (i.e. Self-adaptivity in digital radio beams), by O. Toutan and O. de Luca, published in the journal "L'Onde Electrique", March 1986, Vol. 6, No. 2. This article specifies that the signal received by an antenna may be considered as being the sum of three signals: a direct signal and two delayed signals; and that for the purpose of combining the= =signals, the transfer function of the propagation medium includes, in particular, a term which is sensitive to the frequency of the signal and which is responsible for distortion in the received signal.

This article therefore proposes combining the (composite) signals received from two vertically spaced-apart antennas receiving (individual) signals both of which have travelled through the same transmission medium and been subjected to identical delays, but which are at different relative phases. A diversity combiner sums the signals received by these two antennas after correcting their relative phase and adjusting their respective amplitudes. Phase correction is performed in an adjustable phase shifter placed on the path of one of the signals, and amplitude adjustment is performed by adjustable attenuators placed on the paths of both signals. A diversity control circuit including a microprocessor controls phase correction and level adjustment in such a manner as to ensure that the above-mentioned distortion term is at least greatly reduced, if not completely cancelled.

The embodiment described in this article relates to a heterodyne receiver including an intermediate frequency amplifier with automatic gain control (AGC), and signal analysis equipment including three "sensor" circuits each including a narrowband filter and respectively serving to evaluate the level of the signal in the middle and at the edges of the received spectrum. The diversity control circuit alternates between two operating modes depending on the power level of the wanted signal at intermediate frequency. When the received power level is sufficient, a distortion minimum is sought. The levels from the sensors are combined in order to provide the processor with a distortion value, with the processor acting alternately to adjust the phase shifter and to adjust the two attenuators in directions such that the distortion is reduced on each occasion until minimum distortion is reached.

Whenever the power of the wanted signal drops below a given threshold, then the processor is provided with the automatic gain control signal of the AGC amplifier, and the processor acts on the adjustments of the phase shifter and of the attenuators in order to reduce the AGC signal to a minimum, i.e. in order to increase the power of the wanted signal to a maximum. Whenever the appropriate conditions occur, the change-over between two these two modes of operation is abrupt.

The same article also mentions that an automatic time equalizer may be used in order to counter distortion due to multiple path propagation. In the example described, this equalizer operates at intermediate frequency on the basis of signals sampled in base band and processed by calculation circuits which provide coefficients for a correcting transversal filter. The use of such an equalizer is recommended for path lengths of more than 15 km, i.e. for most cases in practice (in particular when operating at 140 Mb/s with quadrature amplitude modulation (QAM)).

The present invention thus seeks, in receivers for space diversity radio transmission systems including a diversity combiner and a diversity control circuit, together with means for providing a distortion value and means for providing an insufficient power value, to simplify and generalize the prior art diversity control circuit.

SUMMARY OF THE INVENTION

According to one aspect of the invention, said distortion value may be added to said insufficient power value in order to provide a single control magnitude for controlling the diversity combiner.

These arrangements make it possible to control the diversity combiner simultaneously in minimum distortion mode and in maximum power mode without switching abruptly from one to the other.

Said insufficient power value may be derived from the absolute value of the difference between a nominal power value and the received power value as derived from the AGC control signal, said difference being divided by the nominal power.

Said absolute value may be raised to a power $m \geq 1$, in order to provide said insufficient power value.

The effect of these dispositions is to modify the characteristics of the insufficient power signal in such a manner that when sufficient power is available, then the distortion value predominates largely so that the diversity combiner operates essentially in minimum distortion mode, whereas when power is low, then the insufficient power value predominates in turn.

According to another aspect of the invention, the diversity control circuit may include a calculation circuit receiving the coefficients of a self-adaptive equalizer and establishing said distortion value from said coefficients.

Such dispositions advantageously replace the relatively expensive "sensors" mentioned above.

The calculation circuit may sum absolute values derived from said coefficients.

Advantageously, said derived absolute values may include weighting factors. In a particularly simple embodiment, the absolute values of a small number of coefficients only are simply added together.

The above-defined dispositions are used in a direct demodulation receiver, with the diversity combiner being provided at microwave level, whereas an AGC amplifier and a self-adaptive equalizer are inserted in baseband.

This then gives rise to a space diversity receiver which is remarkably simple.

BRIEF DESCRIPTION OF THE DRAWINGS

An embodiment of the invention is described by way of example with reference to the accompanying drawings, in which.

DETAILED DESCRIPTION

Figure 1:
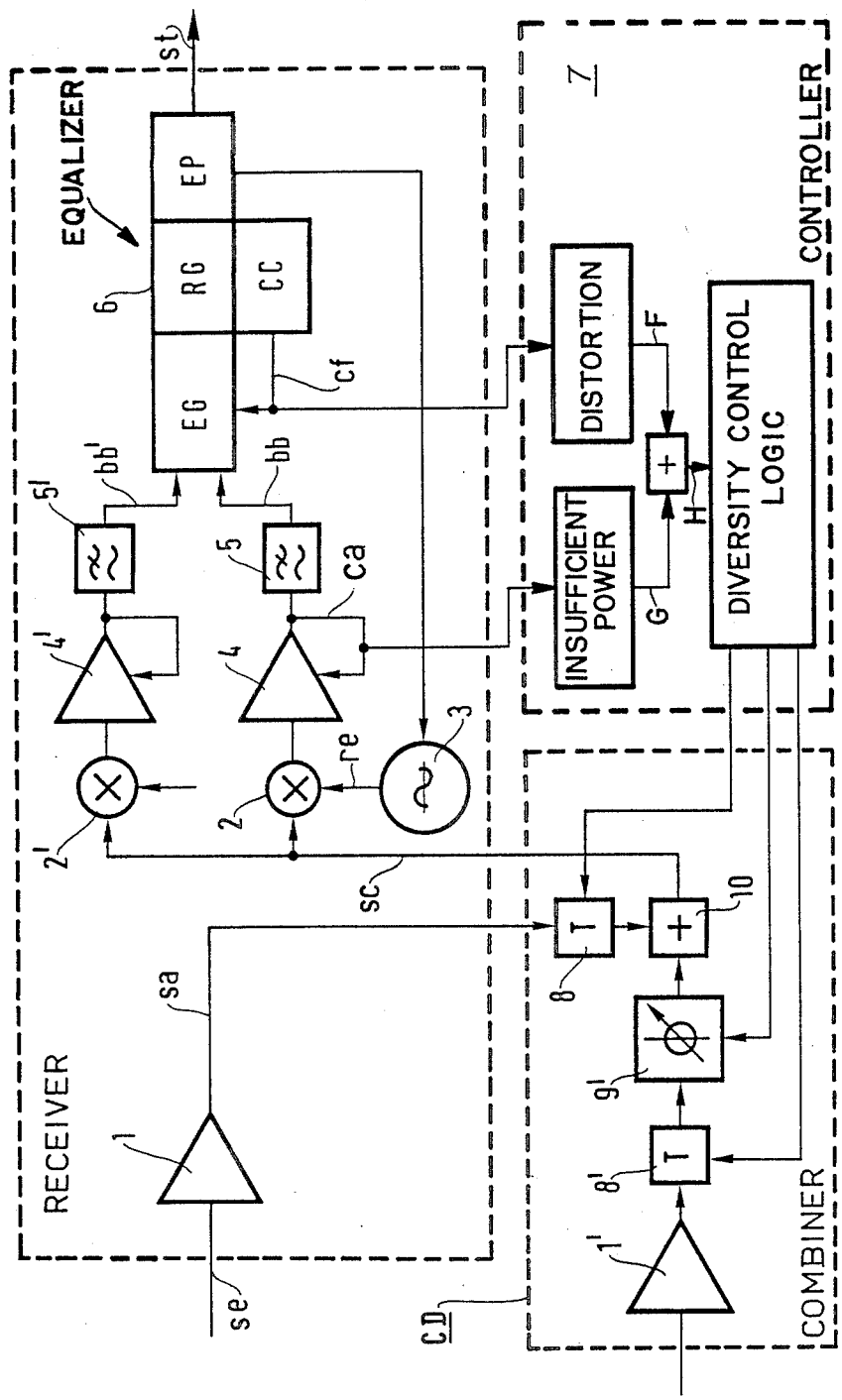
FIG. 1 is a block diagram of a receiver in a radio transmission system, the receiver including a diversity control circuit in accordance with the present invention.

The diagram of FIG. 1 shows an example of the invention being applied to a direct demodulation receiver.

The description begins with a complete normal reception path in the absence of space diversity.

The input signal se from a normal receiver antenna is amplified by a preamplifier 1 which provides an amplified signal sa, which in the absence of space diversity becomes a signal sc for application to a first mixer 2 which also receives a frequency and phase reference wave re from a reference oscillator 3. The signal delivered by the mixer 2 is applied to an amplifier 4 having automatic gain control whose AGC loop is shown diagrammatically and which provides a signal ca representative of the received power. This amplifier is followed by a lowpass filter 5 which passes the baseband signal bb only.

For the general case of a transmission system having a plurality of phase states, similar components 2', 4', and 5' provide other baseband signals bb'.

The, or each, baseband signal is processed by a self-adaptive time equalizer 6 comprising an equalizer EG (a transversal filter), a regenerator RG, and a phase estimator circuit EP whose output provides the transmitted signal st and which also provides a signal for phase-locking the oscillator Associated with the regenerator RG is a coefficient calculating circuit CC which provides coefficients cf which control the time equalizer EG. Although it operates in baseband and not at intermediate frequency, the equalizer assembly 6 corresponds to the assembly described in the above-mentioned article.

Overall, such a receiver is conventional in architecture. The microwave signal after preamplification in the amplifier 1 is applied to the mixers 2 and 2', each of which is also fed with a reference wave at the same frequency as the received signal and at a specified phase. So long as there is phase coincidence, the output signal from each mixer contains a D.C. component as delivered by the lowpass filter 5 or 5', and this represents a baseband signal which corresponds to the presence of a corresponding phase state in the received signal. The waveform of this signal is corrected by the equalizer EG prior to regeneration which is used for recovering a digital signal. By observing the signals in the regenerator EG and in particular the statistical characteristics thereof, it is possible to produce digital values constituting coefficients which are directly usable by the equalizer.

The time equalizer 6 seeks to correct the response curve of the transmission channel in the same manner for each of the phase states and as a function of the signal received by the antenna. However, if the signal is too degraded or too attenuated, such equalization does not suffice.

The prior art solution consists in using space diversity, whereby a second antenna is located at a distance from the first (at a different height up the same tower), and a diversity combiner is used as represented at CD in FIG. 1. The combiner comprises: an amplifier 1' analogous to the amplifier 1; an adjustable attenuator 8 interposed on the above-described normal signal path; an adjustable attenuator 8' similar to the attenuator 8 but interposed in the diversity path; an adjustable phase shifter 9' interposed in the diversity path; and a summing circuit 10 which receives and combines the signals delivered by these two paths in order to deliver the above-mentioned signal sc. As described in the above-specified article, so long as the attenuators and the phase shifter are appropriately adjusted, then adding these two signals together in the summing circuit 10 provides a combined signal sc cancelling the distortion caused by the delayed rays received by the two antennas. This corresponds to minimum distortion operation. If the received power is low, it is still possible to achieve in-phase combination of the signals from the direct rays, thereby providing operation at maximum power.

The two attenuators and the phase shifter in the diversity combiner are controlled by a diversity control circuit 7 which also receives the signals ca and cf.

As is well known, the signal ca represents the level of the signal applied to the input of the amplifier 4 and is preferably converted to digital form by conventional means (not shown). In accordance with one of the characteristics of the invention, an insufficient power value G is derived from this amplitude by applying the formula:

$$G = K \cdot \left| \frac{Pr - Pn}{Pn} \right|^m$$

where Pr is the received power, derived directly from the, signal ca, Pn is a predetermined nominal power, and K is a predetermined scale factor. The value m is a predetermined exponent whose value, according to another characteristic of the invention, is not less than 1.

The above expression is calculated in the diversity control circuit 7, preferably in digital form, after analog-to-digital conversion of the amplitude of the signal ca.

According to another characteristic of the invention, the coefficients of the self-adaptive time equalizer 6 provide information representative of the distortion on the transmission channel.

In a conventional equalizer, these coefficients (other than the center coefficient) are zero when the signal is free of distortion. Otherwise, these coefficients are positive values and negative values provided in the form of complex numbers.

According to another characteristic of the invention, a distortion value is determined by applying the following equation:

$$F = \sum_{\substack{i=-N \\ i \neq 0}}^{L} u \cdot |ai| + \sum_{\substack{i=-N \\ i \neq 0}}^{L} v \cdot |bi|$$

in which ai and bi are respectively the real and the imaginary parts of the i-th coefficient of the self-adaptive equalizer, with the equalizer having N trailing coefficients and L leading coefficients, with each sum being performed on the absolute values of these coefficients, each of which is weighted by a factor u or v.

Some of the weighting factors may be zero, thereby reducing the number of terms that need to be included in the above sum. Other weighting factors may be equal to unity. In a particularly simple embodiment, the absolute values of two or three coefficients only are merely added together.

This gives rise to a single value F which represents the distortion in the received signal. Advantageously, the calculation is performed in the diversity control circuit 7 in digital form on the basis of digital values of the coefficients as provided directly by the calculation circuit CC.

According to another characteristic of the invention, the following sum is performed:

$$H = G + F$$

and the program for adjusting the diversity combiner is based solely on this sum.

As already mentioned, the sum H is mainly constituted by the term F representative of distortion whenever the reception level is sufficient, and is mainly constituted by the term G representative of insufficient power whenever the power level is insufficient.

Figure 2:
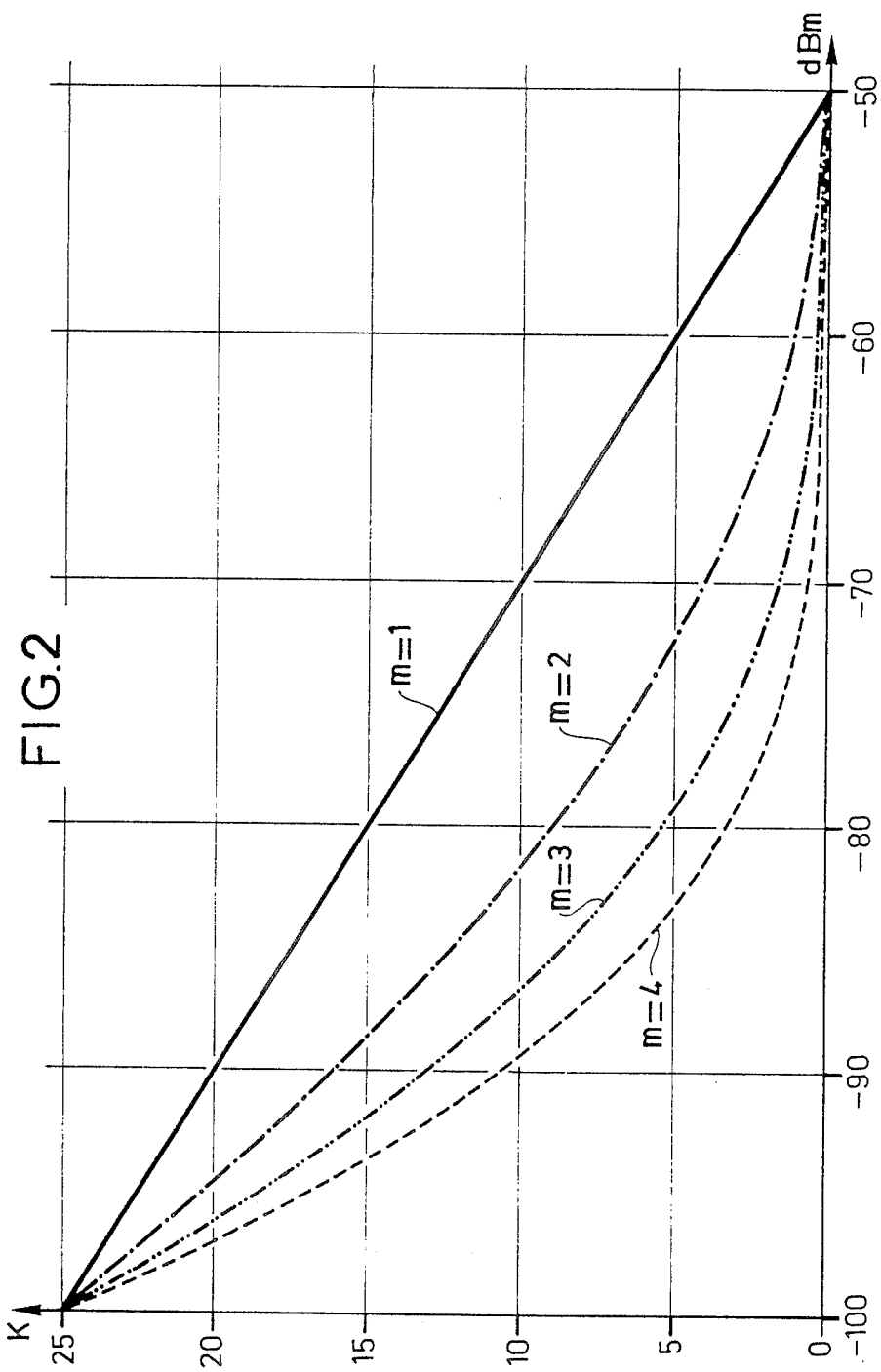
FIG. 2 is a graph of curves representative of the insufficient power signal as a function of received power.

It is mentioned above that the term G is obtained by raising to a power m a term representative of relative lack of power: (Pr−Pn)/Pn. The affect of raising this value to the power m is shown in FIG. 2 where values of G are plotted as a function of received power Pr expressed in dBm, for different values of m. It can be seen that the higher the value of m, the more the characteristic of G is dished, thereby reinforcing the effect mentioned in the preceding paragraph of one or other of F and G being preponderant in the sum H.

Thus, as explained in greater detail below, the invention makes it possible to move smoothly between one operating mode based on minimum distortion to another operating mode based on maximum power.

Figure 3:
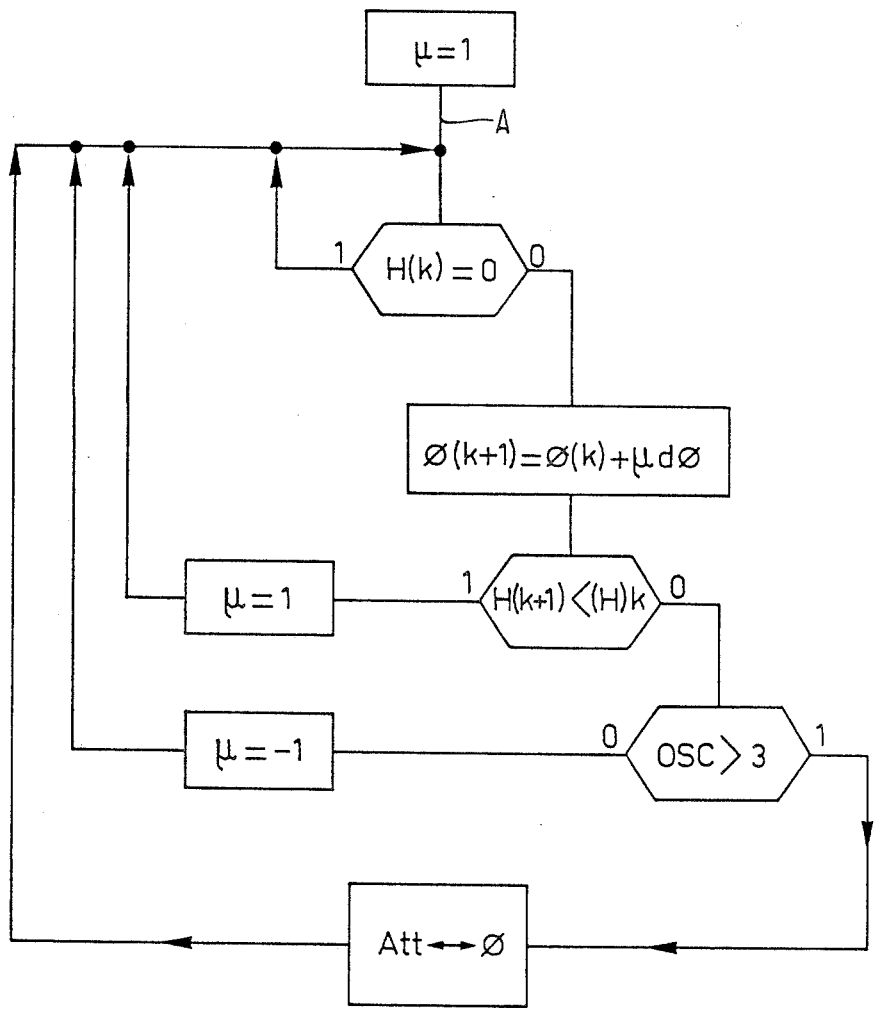
FIG. 3 is a flow chart of the operation of the diversity control circuit in accordance with the present invention.

The way in which the value of the sum H is used for adjusting the diversity combiner is illustrated in FIG. 3 which is a flow chart of the control operations performed by the diversity control circuit 7 for adjusting the components of the combiner.

A flag $\mu$ is initially set to the value $+1$. Operation then begins from point A, and runs, e.g. at periodic intervals, via various loops all of which return to said point A. The attenuators and the phase shifter are in various adjustment positions. The idea is to make small adjustments to these positions in order to reduce the sum H, and to eliminate it where possible. The flow chart is mainly concerned with adjusting the phase shifter, as described below.

In a first stage, the sum H(k) due to earlier adjustment is compared with zero. If this sum is zero, then the adjustment of the combiner is satisfactory. It does not need changing. Operation therefore returns to point A without taking any action.

If the sum H is different from zero, then the phase shifter is adjusted by one step, using the equation:

$$\phi(k+1) = \phi(k) + \mu d\phi$$

where the new adjustment $\phi(k+1)$ is the old adjustment $\phi(k)$ increased by a quantity $d\phi$, given that $\mu$ is equal to $+1$.

Thereafter, after a certain time delay (not shown), the sum H(k+1) obtained as a result of the new adjustment is compared with the previous sum H(k) in order to see whether the previous adjustment has reduced the sum H. If this is indeed the case, then the value of $\mu$ is left at $+1$, so that the next adjustment will take place in the same direction.

In contrast, if the adjustment step has had the effect of increasing the sum H, as may happen when the optimum adjustment point has been overshot, then a value OSC which is a count of oscillations about a given adjustment value is examined. If the value of OSC is less than 3, then OSC is incremented by 1 and the value of $\mu$ is inverted, i.e. it changes from $+1$ to $-1$. The system then returns to point A. The next adjustment step will therefore be performed in the opposite direction.

Phase adjustment continues in this way by looping repeatedly as described until the sum H becomes zero, or if it never becomes zero, until the value of OSC exceeds 3. Under such circumstances, $\phi$ is replaced by Att and the same process is performed for adjusting an attenuator, as symbolized by the expression Att $\longleftrightarrow \phi$.

More precisely, the diversity combiner can be adjusted, for example, by adjusting in alternation firstly the phase shifter, then one of the attenuators, then the phase shifter again, then the other attenuator, etc.

If the sum H is essentially constituted by a distortion value F with the value of G being negligible, then adjustment of the diversity converter components performed in this way for reducing the sum H to a minimum, i.e. for reducing the value of F to a minimum, will give rise in practice to a distortion minimum being obtained. In contrast, if the value G predominates in the sum H, then the adjustment will give rise in practice to a power maximum. Switching between these two situations will occur as a function of the way the terms in the sum H vary, i.e. without any sudden and detrimental changeover.

Figure 4:
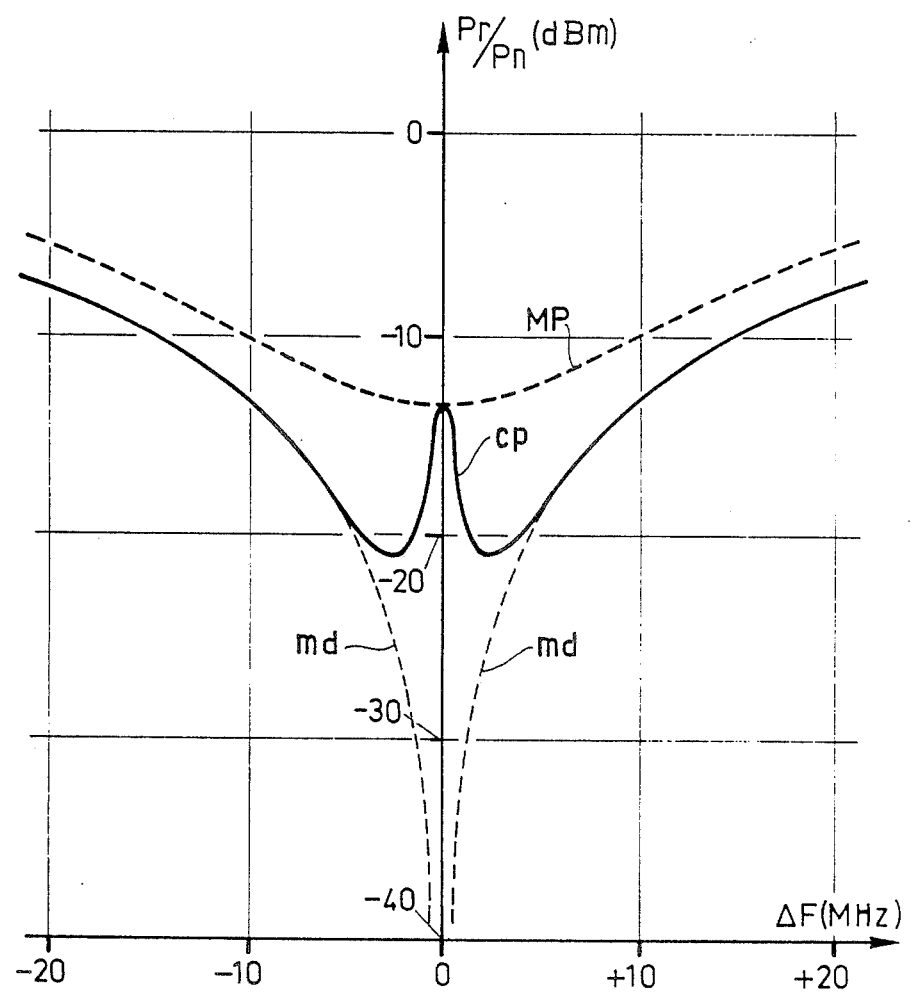
FIG. 4 is a graph showing received power as a function of the frequency difference of selective fading in various operating modes of the diversity controlled circuit.

FIG. 4 illustrates this result, on the basis of a simulation of various propagation conditions. This figure gives curves representative of the relative received power (Pr/Pn) as a function of the frequency difference between selective fading on the two paths, i.e. the normal path and the diversity path, for the various operating modes of the diversity control circuit.

The curve MP, by way of reference, shows the performance of a receiver operating in maximum power mode. The received power reduces somewhat when the frequency difference of selective fading in the two paths becomes small. However distortion remains high.

The curve md, also given by way of reference, corresponds to a receiver operating in minimum distortion mode. Received power falls of considerably when fading coincides.

The curve cp corresponds to the mode of operation provided by the invention. When selective fading is far apart in frequency, the received power remains sufficient and the mode of operation seeks minimum distortion so the curve cp follows the curve md. When the received power reaches a defined minimum, minimum distortion mode is taken over progressively by maximum power mode and the curve cp rises to the level of the curve MP.

Naturally the above description is given purely by way of non-limiting example, and numerous variants may be designed without thereby going beyond the scope of the invention.

We claim:

1. A receiver for a space diversity radio transmission system, said receiver comprising:
    a diversity combiner for combining a plurality of individual signals into a composite signal,
    distortion measurement means for deriving a distortion value from the composite signal,
    power measurement means for deriving an insufficient power value from the composite signal,
    diversity control logic responsive to a single control signal for correcting the relative phase and amplitude of the individual signals so as to minimize the single control signal, and
    means for summing said distortion value and said insufficient power value to thereby provide said single control signal,
    whereby the diversity combiner may be controlled simultaneously in a minimum distortion mode and a maximum power mode without switching abruptly from one mode to the other.

2. A receiver according to claim 1, wherein
    the receiver system further comprises an amplifier having an automatic gain control circuit which generates an AGC signal, and
    said insufficient power value is derived from the AGC signal.

3. A receiver according to claim 2, wherein said insufficient power value is proportional to the absolute value of the difference between a predetermined nominal power value and a received power value derived from the AGC signal.

4. A receiver according to claim 3, wherein said insufficient power value is obtained by normalizing said absolute value by diving it by said predetermined nominal power value and then raising the resulting normalized value to a power $m > 1$ to thereby reinforce the tendency of the control signal to be dominated by the distortion value except when the power level is below said predetermined nominal value.

5. A receiver according to claim 1, wherein said distortion measurement means further comprises
    a self-adaptive equalizer including
        a transversal filter responsive to filter coefficients
        a first calculation circuit in the transmission path of the composite signal for generating said filter coefficients such that distortion is minimized, and
        a second calculation circuit responsive to at least some of said filter coefficients for deriving said distortion value from said at least some coefficients.

6. A receiver according to claim 5, wherein the second calculation circuit sums a plurality of positive values each derived from a respective one of said at least some coefficients.

7. A receiver according to claim 6, wherein each said positive value consists of the absolute value of the respective coefficient multiplied by a respective weighting factor.

8. A receiver according to claim 7, wherein the respective weighting factors are either 0 or 1.

9. A receiver according to claim 5 further comprising an amplifier having an automatic gain control circuit which generates an AGC signal, wherein
    said receiver is a direct demodulation receiver,
    said insufficient power value is derived from the AGC signal,
    said diversity combiner operates at microwave level and
    said amplifier and said self-adaptive equalizer are inserted in baseband.

10. A receiver according to claim 8, wherein at least several of the weighting factors are 0.

11. A receiver according to claim 10, wherein at most only three of the weighting factors are 1.

12. A receiver according to claim 5, wherein
    the receiver system further comprises an amplifier having an automatic gain control circuit responsive which generates an AGC signal, and
    said insufficient power value is derived from the AGC signal.

13. A receiver according to claim 12, wherein said insufficient power value is proportional to the absolute value of the difference between a predetermined nominal power value and a received power value derived from the AGC signal.

14. A receiver according to claim 13, wherein said insufficient power value is obtained by normalizing said absolute value by dividing it by said predetermined nominal power value and then raising the resulting normalized value to a power $m > 1$ to thereby reinforce the tendency of the control signal to be dominated by the distortion value except when the power level is below said predetermined nominal value.

15. A receiver for a space diversity radio transmission system, said receiver comprising:
    a diversity combiner for combining a plurality of individual signals into a composite signal,
    a diversity control circuit responsive to a control signal for correcting the relative phase and amplitude of the individual signals such that the control signal is minimized,
    a self-adaptive equalizer including
        a transversal filter responsive to filter coefficients and
        a first calculation circuit in the transmission path of the composite signal for generating said filter coefficients such that distortion is minimized, and
        a second calculation circuit responsive to at least some of said filter coefficients for deriving said control signal.

16. A receiver according to claim 15, wherein the second calculation circuit sums a plurality of positive values each derived from a respective one of said coefficients.

17. A receiver according to claim 16, wherein each said positive value consists of the absolute value of the respective coefficient multiplied by a respective weighting factor.

18. A receiver according to claim 17, wherein the respective weighting factors are either 0 or 1.

19. A receiver according to claim 18, wherein at least several of the weighting factors are 0.

20. A receiver according to claim 19, wherein at most only three of the weighting factors are 1.

* * * * *

UNITED STATES PATENT AND TRADEMARK OFFICE
CERTIFICATE OF CORRECTION

PATENT NO. : 4,972,434

DATED : November 20, 1990

INVENTOR(S) : Xavier Le Polozec; Dominique Pujol

It is certified that error appears in the above-identified patent and that said Letters Patent is hereby corrected as shown below:

ON THE TITLE PAGE

[56] References, after "4,326,294" change "4/1983" to -- 4/1982 --.

Column 1, line 26, after "combining" delete "the==" and insert -- these --.

Column 3, line 49, after "oscillator" insert -- 3. --.

Column 4, line 52, after "the" and before "signal" delete the comma.

Column 6, line 62, after "falls" change "of" to -- off --.

Column 7, line 43, change "diving" to -- dividing --.

Signed and Sealed this

Twenty-first Day of April, 1992

Attest:

HARRY F. MANBECK, JR.

*Attesting Officer*     *Commissioner of Patents and Trademarks*